(12) United States Patent
Fouarge et al.

(10) Patent No.: US 7,473,743 B2
(45) Date of Patent: Jan. 6, 2009

(54) SURFACE FINISH OF REACTOR

(75) Inventors: Louis Fouarge, Dilbeek (BE); Marc Van der Auwera, Tervuren (BE)

(73) Assignee: TOTAL Petrochemicals Research Feluy, Feluy (BE)

( * ) Notice: Subject to any disclaimer, the term of this patent is extended or adjusted under 35 U.S.C. 154(b) by 0 days.

(21) Appl. No.: 11/498,299

(22) Filed: Jul. 27, 2006

(65) Prior Publication Data

US 2007/0066770 A1    Mar. 22, 2007

(51) Int. Cl.
*C08F 2/12*    (2006.01)
*C08F 110/02*    (2006.01)

(52) U.S. Cl. .............................. 526/62; 526/64; 148/253
(58) Field of Classification Search .................. 526/62, 526/64; 148/253

See application file for complete search history.

(56) References Cited

U.S. PATENT DOCUMENTS

| 5,047,095 A | * | 9/1991 | Geke et al. ................... 148/259 |
| 2005/0095176 A1 | * | 5/2005 | Hottovy ....................... 422/131 |

FOREIGN PATENT DOCUMENTS

| EP | 0107127 | * | 5/1984 |
| EP | 1564221 | * | 8/2005 |

* cited by examiner

*Primary Examiner*—Fred M Teskin
(74) *Attorney, Agent, or Firm*—Tenley R. Krueger

(57) ABSTRACT

This invention discloses the use in the production of a polyolefin of a slurry loop reactor wherein all internal parts in contact with the slurry are polished first by a mechanical process to a level of at most 70 RMS roughness value and are subsequently polished by a chemical or electrochemical process, to a final level of at most 40 RMS roughness value.

22 Claims, No Drawings

SURFACE FINISH OF REACTOR

This invention concerns a new surface finish of the internal parts of a slurry loop reactor that prevents fouling in the reactor during the polymerisation of olefins.

It is well known that polymers of olefins can be prepared by olefin polymerisation in a hydrocarbon diluent or in monomers acting as diluents. However, it has been found on an industrial scale that where the polymer is insoluble or substantially insoluble in the diluent, the polymer product has a tendency to deposit on the wall of the polymerisaton reactor. This so-called "fouling" leads to a decrease in the efficiency of heat exchange between the reactor bulk and the coolant around the reactor. In some cases, the temperature difference between the reactor bulk temperature and temperature of the coolant (e.g. a cooling water system) can increase over time to a level, which means that the run must be terminated.

This "fouling" is caused by a combination of fines and the build up of electrostatic charge in the powder. Attempts to avoid fouling have been made by adding an antifouling agent to the diluent as a processing aid. Typically, the antifouling agent acts to make the diluent more conductive. This prevents to some extent the formation of electrostatic charge, which is one cause of the build-up of polymer on the wall of the reactor.

U.S. Pat. No. 3,995,097 discloses a process whereby an olefin is polymerised in a hydrocarbon diluent using a catalyst comprising chromium oxide associated with at least one of silica, alumina, zirconia, or thoria. Fouling of the reactor is said to be reduced by adding a composition, which comprises a mixture of aluminium or chromium salts of an alkyl salicylic acid and an alkaline metal alkyl sulphur succinate.

EP 0005215 is concerned with a process for polymerising olefins in a hydrocarbon diluent again using a catalyst comprising calcined chromium compound associated with at least one of silica, alumina, zirconia or thoria or using a catalyst system such as those disclosed in U.S. Pat. Nos. 2,908,671, 3,919,185 and 3,888,835. The process uses an anti-fouling agent comprising a compound containing a sulphonic acid residue. The anti-fouling agent is a composition comprising (a) a polysulphone copolymer (b) a polymeric polyamine, and (c) an oil soluble sulphonic acid. In the Example, the additive product Stadis 450 is used as the anti fouling agent.

U.S. Pat. No. 6,022,935 (equivalent to EP 0803514) discloses a process for the preparation of polymers of $C_2$-$C_{12}$ alk-1-ene using a catalyst system containing a metallocene complex. An antistatic agent is used in the process. It is said that in general, all antistatic agents which are suitable for polymerisations may be used. Examples given are salt mixtures comprising calcium salts of medialanic acid and chromium salts of N-stearylanthranilic acid, $C_{12}$-$C_{22}$ fatty acid soaps of sulfonic esters of the general formula (RR')—CHOSO$_3$Me, esters of polyethylene glycols with fatty acids, and polyoxyethylene alkyl ethers.

EP 0820474 is concerned with preventing sheeting problems in gas phase reactors in polymerisation processes, which comprise at least one loop reactor followed by at least one gas phase reactor. These problems are addressed using a fouling preventive agent that is a mixture of Cr salt of $C_{14}$-$C_{18}$ alkyl-salicylic acid, a Ca dialkyl sulphosuccinate and a copolymer of alkylmethacrylate with 2-methyl-5-vinylpyridine in solution in xylene. Chromium-type catalysts, Ziegler-type catalysts and metallocene catalysts are mentioned.

In view of the above it will be seen that many so called anti-fouling agents for use in olefin polymerisation processes are known. However, there has been a problem with prior known agents, particularly in relation to polymerisation processes using chromium-type catalysts or Ziegler-Natta type catalysts because of loss of activity of the catalyst due to the presence of the anti-fouling agent. This is because of poisoning of the catalyst, for example by alcohol and sulphonate groups in the anti-fouling agent.

Other problems with prior known agents relate to problems of toxicity. This is a particular concern with Stadis 450 as described in EP 0005215.

Thus, there remains a need to provide new methods for preventing fouling in olefin polymerization processes, especially in the polymerisation of ethylene and more especially in the polymerisation of high molecular weight polyethylene.

Accordingly, the present invention discloses a slurry loop reactor wherein all internal parts of the reactor in contact with the slurry are polished first by a mechanical process to a roughness level of at most 70 RMS (root mean square) and are subsequently polished by a chemical or electrochemical process, to a final level of roughness of at most 40 RMS.

There are two methods for defining the level of roughness of a surface: the arithmetic mean roughness value $R_a$ (CLA), specified by the methods of standard tests DIN 4768/1, DIN 4762/1 or ISO/DIS 4287/1, and the root mean square roughness value $R_q$ (RMS), specified by the methods of standard tests DIN 4762/1 or ISO/DIS 4287/1.

Ra is the arithmetical average value of all absolute distances y of the roughness profile R from the centre line with measuring length $I_m$: it can be written as $$Ra = 1/l_m \int_{x=0}^{x=l_m} |y(x)| dx$$

Rq is defined as the RMS value of a profile calculated over a single sampling length, but it can be expressed as the mean result of 5 consecutive sampling lengths $l_m$: it can be expressed as $$Rq = sqrt\left(1/l_m \int_{x=0}^{x=l_m} y^2(x) dx\right)$$

In the present invention the RMS method was adopted.

Preferably, the final level of roughness is of about 32 RMS (0.8 microns).

The present invention also discloses the use, in the production of a polyolefin, of a slurry loop reactor wherein all internal parts in contact with the slurry are first polished by a mechanical process to a level of at most 70 RMS roughness value and are subsequently polished by a chemical or electrochemical process to a final level of at most 40 RMS roughness value.

The reactor material can be selected from carbon steel, stainless steel or carbon steel with stainless steel cladding. Preferably, it is carbon steel. Typically the level of roughness of the untreated material is of at least 250 RMS.

The mechanical polishing is known in the art and uses consecutive sand papers having appropriately decreasing level of coarseness. Typically the mechanical polishing can bring the level of roughness down to a value of about 63 RMS.

The electrochemical polishing is known in the art and is disclosed for example in U.S. Pat. No. 4,772,367 that describes a method for polishing and/or pickling the inner surfaces of tubes with a polishing head. The polishing head comprises a dielectric outer wall defining a narrow working gap with respect to the surface to be polished allowing for the electrolyte to flow through said gap. For a further description of electrochemical polishing, reference is made to the aforementioned U.S. Pat. No. 4,722,367, the entire disclosure of which is incorporated herein by reference.

The chemical polishing is also known in the art and is described for example in U.S. Pat. No. 5,047,095. Large objects such as the reactor parts are treated using a spray-on technique. For tubes or pipes the treating solution is pumped through the tube. The amount of metal removed is controlled by the immersion time whereas the rate of metal removal is controlled by the concentration of the polishing solution. Typically the rate of removal is of from 1 to 3 icrons/minute. For a further description of electrochemical polishing, reference is made to the aforementioned U.S. Pat. No. 5,047,095, the entire disclosure of which is incorporated herein by reference.

Typically, the polishing aqueous solution has a pH of from 1 to 6, preferably of from 3.5 to 5. It comprises, as an essential ingredient, orthophosphoric acid and/or condensed phosphoric acids and/or water soluble salts thereof and one or more carboxylic acids having either two or three carboxyl groups per molecule, optionally one or more surfactants and optionally one or more corrosion inhibitor.

Preferably, alkali metal salts and/or ammonium salts or orthophosphoric acid and/or condensed phosphoric acids are used as the phosphate component.

Suitable alkali metal salts include salts of lithium, sodium, potassium, rubidium or cesium. The preferred alkali metal salts are sodium and potassium salts.

Suitable ammonium salts contain either an $NH_4^+$ cation or one or more organic substituents on the nitrogen atom, said substituents being preferably alkyls having from 1 to 6 carbon atoms. $NH_4^+$ salts are most preferred.

Typically, the aqueous solution contains 0.2 to 12 wt % of the phosphate component. The quantities by weight are based on the prepared in-use solution.

Individual compounds or mixtures of di- and tri-carboxylic acids are used in amounts of 0.01 to 1 wt % in the aqueous solution.

Surfactants, if present can be added in amounts of at most 2 wt %, preferably from 0.005 to 2 wt %.

Corrosion inhibitors, if present can be added in amounts of at most 0.2 wt %, preferably from 0.01 to 0.2 wt %.

Polishing is carried out at a temperature of from 20 to 60° C., preferably at room temperature (about 25° C.).

The treatment time depends upon the nature of the material and upon the final level of roughness to be achieved. Typically it is of from 10 to 60 minutes.

Preferably, the solution is circulated in order to carry away the detached metal particles and impurities, thereby increasing the rate of metal removal.

The chemical polishing comprises the steps of:
degreasing and activating the surfaces (pre-treatment);
polishing and deburring with the polishing solution (treatment);
passivating and drying (post-treatment).
Rinsing with water is carried out between each step.

Typically, 0.1 $dm^2$ of surface can be treated by about 1 liter of polishing solution.

The finished internal surfaces of the reactor have a level of roughness inferior to 1 μm, and they are free of burrs and fissures.

It has been observed that polishing the internal surfaces of the reactor is particularly useful in the polymerisation of a polyolefin, especially in the polymerisation of ethylene, more especially in the polymerisation of high molecular weight polyethylene.

The invention claimed is:

1. A method for the polymerization of an olefin to produce a polyolefin comprising:
   a) providing a reactor system comprising a loop reactor having an internal wall surface providing a path for the flow of a polymer slurry within said reactor;
   b) polishing the internal wall surface of said loop reactor by an initial mechanical polishing procedure with abrasive sanding to provide said internal wall surface at the conclusion of said sanding with a roughness value Rq of no more than 70 RMS;
   c) subjecting said mechanically polished internal wall surface to a secondary polishing by an electrochemical polishing or chemical polishing to provide an internal reactor surface at the conclusion of said secondary polishing operation having a roughness value Rq of no more than 40 RMS;
   d) introducing an olefin monomer and a polymerization catalyst into said reactor system to produce a polyolefin slurry circulating through said loop reactor; and
   e) recovering said polyolefin from said loop reactor.

2. The method of claim 1 wherein said olefin monomer is ethylene and said olefin polymer is polyethylene.

3. A method for the polymerization of an olefin to produce a polyolefin comprising:
   a) providing a reactor system comprising a loop reactor having an internal wall surface providing a path for the flow of a polymer slurry within said reactor;
   b) polishing the internal wall surface of said loop reactor by an initial mechanical polishing procedure with abrasive sanding to provide said internal wall surface at the conclusion of said sanding with a roughness value Rq of no more than 70 RMS;
   c) subjecting said mechanically polished internal wall surface to a secondary polishing by an electrochemical polishing or chemical polishing to provide an internal reactor surface at the conclusion of said secondary polishing operation having a roughness value Rq of no more than 40 RMS;
   d) introducing an olefin monomer and a polymerization catalyst into said reactor system to produce a polyolefin slurry circulating through said loop reactor; and
   e) recovering said polyolefin from said loop reactor; and
wherein said olefin monomer is ethylene and said olefin polymer is polyethylene, and wherein said secondary polishing process is a chemical polishing process.

4. The method of claim 3 wherein said chemical polishing process is carried out with an aqueous polishing solution having a pH within the range of 1-6.

5. The method of claim 4 wherein said aqueous polishing solution has a first component selected from a group consisting of an orthophosphoric acid, a condensed phosphoric acid, and water soluble salt of said orthophosphoric acid and condensed phosphoric acid and a second component comprising at least one carboxylic acid having 2 or 3 carboxyl groups per molecule.

6. The method of claim 5 wherein said first component is present in said aqueous solution in an amount within the range of 0.2-12 weight percent.

7. The method of claim 6 wherein said second component is present in said solution in an amount within the range of 0.01-1 weight percent.

8. method of claim 7 wherein said polishing solution has a pH within the range of 3.5-5.

9. The method of claim 5 wherein said chemical processing polishing procedure is carried out at a temperature within the range of 20° C.-60° C.

10. The method of claim 5 wherein said first component comprises an alkali metal or ammonium or organoammonium salt of at least one of said orthophosphoric acid and condensed phosphoric acid.

11. The method of claim 10 wherein said salt is an alkali metal salt.

12. The method of claim 11 wherein said salt is a sodium or potassium salt.

13. The method of claim 10 wherein said salt is an ammonium salt or an organoammonium salt.

14. The method of claim 13 wherein said salt is an ammonium salt.

15. The method of claim 13 wherein said salt is an organoammonium salt having at least one $C_1$-$C_6$ alkyl group on the nitrogen atom.

16. The method of claim 4 wherein said internal wall surface of said reactor has a initial roughness Rq value prior to polishing of at least 250 RMS.

17. The method of claim 4 wherein the reactor is a slurry loop reactor.

18. The method of claim 4 wherein said chemical polishing process is carried out with an aqueous polishing solution, and wherein the polishing solution is comprised of surfactants and/or corrosion inhibitors.

19. The method of claim 11 wherein the alkali metal salts include salts selected from the group consisting of lithium, sodium, potassium, rubidium, and a combination thereof.

20. The method of claim 4 wherein the reactor material is selected from the group consisting of carbon steel, stainless steel, carbon steel with stainless steel cladding, stainless steel with stainless steel cladding, and a combination thereof.

21. The method of claim 4 wherein a polishing treatment time is from 10 to 60 minutes.

22. A method for the polymerization of an olefin to produce a polyolefin comprising:
   a) providing a reactor system comprising a loop reactor having an internal wall surface providing a path for the flow of a polymer slurry within said reactor;
   b) polishing the internal wall surface of said loop reactor by an initial mechanical polishing procedure with abrasive sanding to provide said internal wall surface at the conclusion of said sanding with a roughness value Rq of no more than 70 RMS;
   c) subjecting said mechanically polished internal wall surface to a secondary polishing by a chemical polishing to provide an internal reactor surface at the conclusion of said secondary polishing operation having a roughness value Rq of no more than 40 RMS;
   d) introducing an olefin monomer and a polymerization catalyst into said reactor system to produce a polyolefin slurry circulating through said loop reactor; and
   e) recovering said polyolefin from said loop reactor.

* * * * *

UNITED STATES PATENT AND TRADEMARK OFFICE
CERTIFICATE OF CORRECTION

PATENT NO.        : 7,473,743 B2                                          Page 1 of 1
APPLICATION NO. : 11/498299
DATED             : January 6, 2009
INVENTOR(S)       : Louis Fouarge and Van der Auwera It is certified that error appears in the above-identified patent and that said Letters Patent is hereby corrected as shown below:

Claim 16, column 5, line 16, "claim 4", should read --claim 3--.
Claim 17, column 5, line 19, "claim 4", should read --claim 3--.
Claim 18, column 5, line 21, "claim 4", should read --claim 3--.
Claim 20, column 6, line 1, "claim 4", should read --claim 3--.
Claim 21, column 6, line 5, "claim 4", should read --claim 3--.

Signed and Sealed this

Twenty-third Day of June, 2009

JOHN DOLL
*Acting Director of the United States Patent and Trademark Office*